P. E. HAUGH.
SHOCK ABSORBER.
APPLICATION FILED FEB. 16, 1912.
1,034,231.
Patented July 30, 1912.
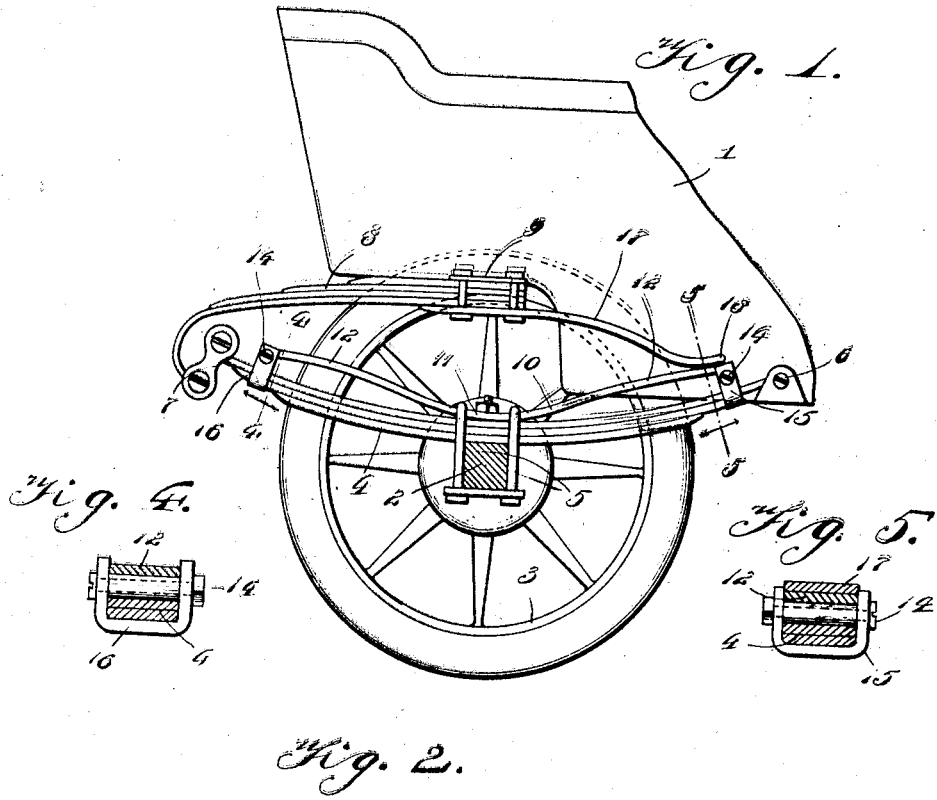
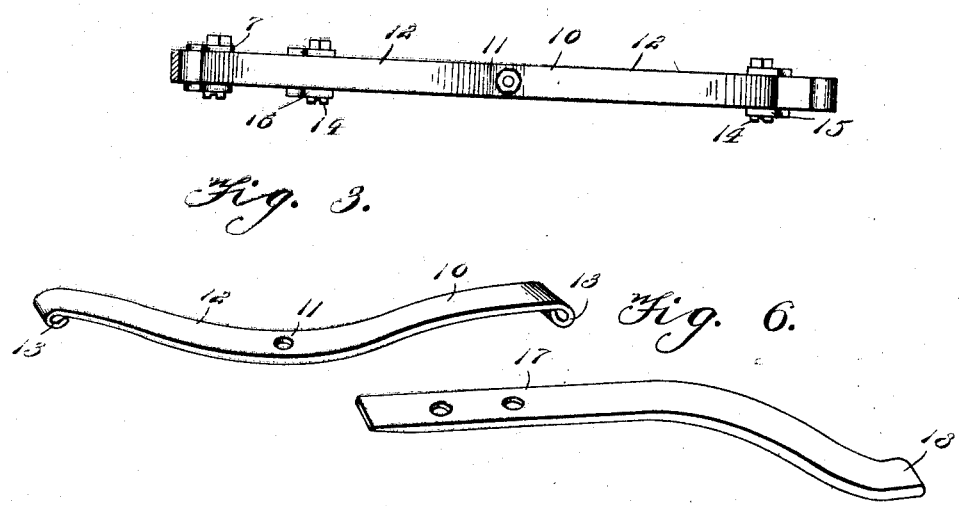
Philip Edward Haugh, Inventor
By Victor J. Evans, Attorney
Witnesses

UNITED STATES PATENT OFFICE.

PHILIP EDWARD HAUGH, OF MILLVALE, PENNSYLVANIA.

SHOCK-ABSORBER.

1,034,231.  Specification of Letters Patent.  Patented July 30, 1912.

Application filed February 16, 1912. Serial No. 678,034.

*To all whom it may concern:*

Be it known that I, PHILIP EDWARD HAUGH, a citizen of the United States, residing at Millvale, in the county of Allegheny and State of Pennsylvania, have invented new and useful Improvements in Shock-Absorbers, of which the following is a specification.

This invention relates to shock absorbers and the object of the invention is to provide a simple and economical device of the class described in the form of a spring applicable to and especially designed for use in connection with the ordinary spring construction of automobiles, whereby the upward thrust of the spring and vehicle body is resisted in an effective manner which will prevent the breaking of the springs of an automobile or other vehicle and also relieve the thrust and disagreeable and quick movements imparted to the body of the vehicle and the occupants of the same.

The shock absorbing device is so constructed that it may be applied to any ordinary automobile now in use.

With the above and other objects in view, the invention consists in the construction, combination and arrangement of parts, set forth in and falling within the scope of the appended claim.

In the drawings:—Figure 1 is a side elevation of the rear portion of an automobile, showing the axle in section, with the improved shock absorbing device applied thereto. Fig. 2 is a plan view of the same, partly in section. Fig. 3 is a detail perspective view of the main spring member of the shock absorbing device. Fig. 4 is a cross section on the line 4—4 of Fig. 1. Fig. 5 is a cross section on the line 5—5 of Fig. 1. Fig. 6 is a detail perspective view of the other member of the shock absorbing device.

The invention has been shown applied to the ordinary automobile spring interposed between the body of the vehicle indicated at 1 and the rear axle 2, 3 designating the rear driving wheels of the machine. It is the ordinary practice to mount a semi-elliptical spring 4 on the axle 2, said spring being retained in position by one or more clips 5. The forward end of the elliptical spring 4 has a jointed connection at 6 with the body and at its opposite or rear end it is connected by swing links 7 to the rear downwardly turned extremity of a C-shaped spring 8 which is rigidly secured to the body at 9. The construction thus far described is the ordinary spring arrangement.

In carrying out the present invention, I employ a shock absorbing single leaf spring 10, the central part of which is in the form of an inverted bow 11 which rests upon the top of the semi-elliptical spring 4 and is secured by the same clips 5 above referred to. the opposite end portions of the spring 10 are reversely bowed or curved as shown at 12 and the extremities thereof are bent around to form sleeves or eyes 13 which receive bolts 14 or their equivalent passing through U-shaped clips or yokes 15 and 16 embracing, respectively, the forward and rear portions of the semi-elliptical spring 4, as shown in Fig. 1. The end portions 12 of the shock absorbing spring exert a downward pressure and resist the upward thrust of the corresponding end portions of the semi-elliptical spring 4, thus relieving the powerful upward thrust of the body after the wheels strike a sudden depression or elevation in the road.

In conjunction with the shock absorbing spring just hereinabove described, I also prefer to employ an auxiliary or complemental shock absorbing spring 17 having one end rigidly secured to the body preferably under the rigidly attached end of the C-shaped spring 8, as shown in Fig. 1. The spring 17 extends forward and curves downward until near the extremity thereof where it is given a reverse bend to provide a lip 18 which rests upon the forward end of the spring 10, as shown in Fig. 1. This complemental or auxiliary shock absorbing spring assists the spring 10 in resisting the upward movement of the body and spring of the vehicle and adds further to the comfort of the occupants of the vehicle and also decreases the liability of breakage of the springs.

I claim:—

The combination with a vehicle spring embodying a semi-elliptical member and a C-shaped member connected by a swing link, of a shock absorber embodying a spring having a compound curve and attached medially to the middle part of the elliptical member and terminally to the end portions of the same, and a curved spring, one end of which bears a fixed relation to the vehicle
5 body, the other end exerting a resisting pressure against the elliptical member adjacent to one end of the latter.

In testimony whereof I affix my signature in presence of two witnesses.

PHILIP EDW. HAUGH.

Witnesses:
GEORGE P. BROWN,
WILLIAM J. HITTNER, Jr.